United States Patent [19]

Ogawa et al.

[11] Patent Number: 5,128,702

[45] Date of Patent: Jul. 7, 1992

[54] DATA IMPRINTING DEVICE FOR CAMERA

[75] Inventors: Yukio Ogawa; Kiyoshi Alyfuku, both of Kanagawa, Japan

[73] Assignee: Canon Kabushiki Kaisha, Tokyo, Japan

[21] Appl. No.: 547,327

[22] Filed: Jul. 3, 1990

Related U.S. Application Data

[63] Continuation of Ser. No. 419,754, Oct. 10, 1989, abandoned, which is a continuation of Ser. No. 344,454, Apr. 27, 1989, abandoned, which is a continuation of Ser. No. 258,130, Oct. 14, 1988, abandoned, which is a continuation of Ser. No. 188,061, Apr. 27, 1988, abandoned, which is a continuation of Ser. No. 89,815, Aug. 27, 1987, abandoned.

[30] Foreign Application Priority Data

| Sep. 2, 1986 [JP] | Japan | 61-207011 |
| Dec. 27, 1986 [JP] | Japan | 61-312688 |
| Dec. 27, 1986 [JP] | Japan | 61-312689 |

[51] Int. Cl.$^5$ .................................................. G03B 17/24
[52] U.S. Cl. ................................................................ 354/106
[58] Field of Search .................. 354/105, 106; 355/39; 352/90

[56] References Cited

U.S. PATENT DOCUMENTS

| 2,259,238 | 10/1941 | Bernhard | 355/39 |
| 3,552,283 | 1/1971 | Babcock et al. | 354/106 |
| 4,053,909 | 10/1977 | Shinoda et al. | 354/105 |
| 4,183,645 | 1/1980 | Ohmura et al. | 354/106 |
| 4,705,372 | 11/1987 | Lapeyre | 354/106 |

FOREIGN PATENT DOCUMENTS 55-25021 2/1980 Japan .

Primary Examiner—Michael L. Gellner
Attorney, Agent, or Firm—Fitzpatrick, Cella, Harper & Scinto

[57] ABSTRACT

A data imprinting device for a camera which imprints data on a film, forming characters, numerals, etc. with dots by operating a plurality of dot imprinting parts in synchronism with the travel of the film, comprises: a detector for detecting whether the camera is in a lateral posture or a vertical posture; and a controller for causing the same dot imprinting parts to operate in such a manner that required data is imprinted in a correctly uprising state in a lateral position when the lateral posture is detected and in a vertical position when the vertical posture is detected.

16 Claims, 12 Drawing Sheets

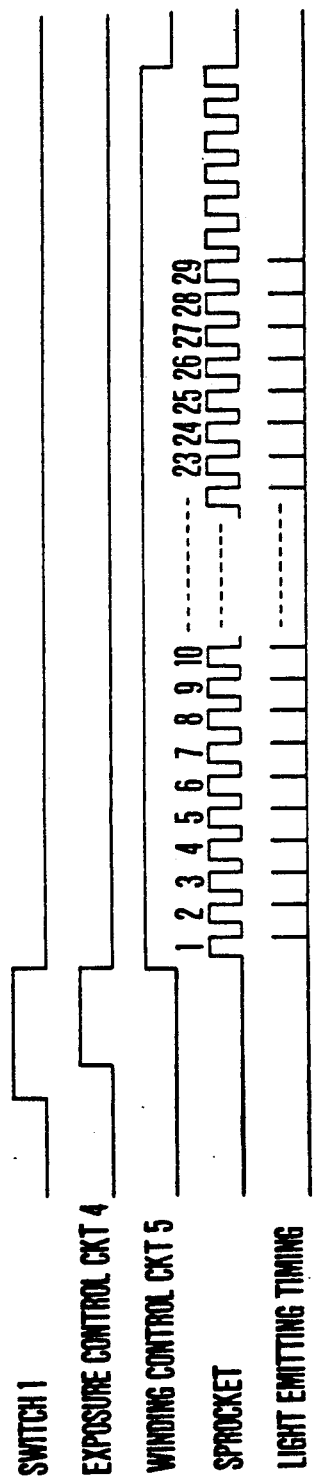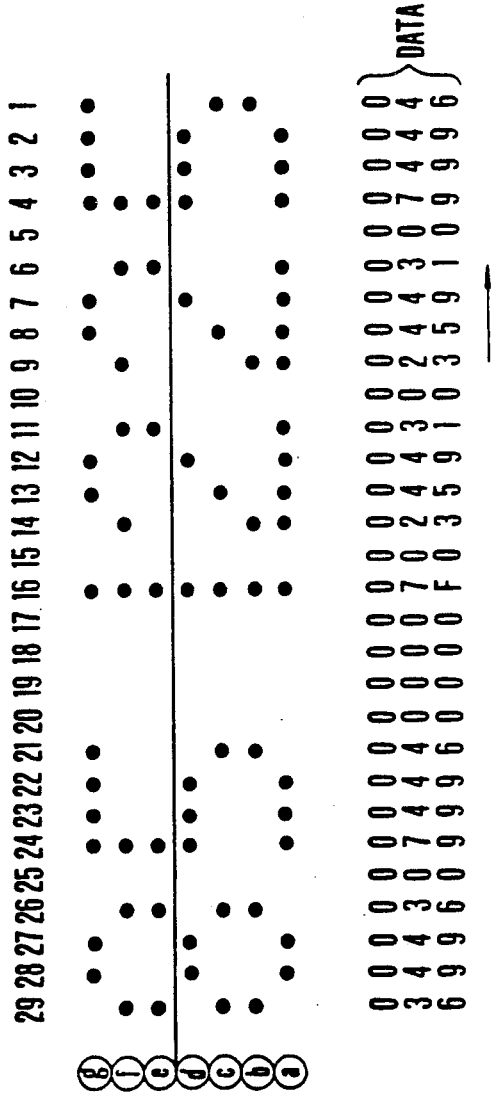

DATA IMPRINTING DEVICE FOR CAMERA

This application is a continuation of application Ser. No. 419,754 filed Oct. 10, 1989, now abandoned, which is a continuation of application Ser. No. 344,454 filed on Apr. 27, 1989, now abandoned which is a continuation of application Ser. No. 258,130 filed on Oct. 14, 1988, now abandoned, which is a continuation of application Ser. No. 188,061 filed on Apr. 27, 1988 now abandoned, which is a continuation of application Ser. No. 089,815 filed on Aug. 27, 1987, now abandoned.

BACKGROUND OF THE INVENTION

1. Field of the Invention

This invention relates to a data device for a camera and more particularly to an improvement on such a data imprinting device that is capable of imprinting data on a film in a state suited to the vertical or lateral posture of the camera in accordance with a change in the posture of the camera.

2. Description of the Related Art

Data imprinting devices for cameras of varied kinds have been proposed, or put into practice, for imprinting photographic data on a film.

One of these prior art devices is arranged to have the data imprinted always in a correctly uprising state irrespective as to whether the camera is held in its lateral posture or in its vertical posture in photographing. This device was disclosed in U.S. Pat. No. 4,183,645. In the device disclosed, two groups of data imprinting light emitting parts are discretely provided, one for the lateral posture and the other for the vertical posture of the camera. One of the data imprinting light emitting part groups is selectively used according to whether the camera is in the lateral or vertical posture. The imprinting data is thus arranged to be imprinted always in a state of uprising in the correct direction relative to an object to be photographed as shown in FIGS. 13(a) and 13(b) of the accompanying drawings. FIG. 13(a) shows data characters imprinted on a picture which is taken with the camera held in its lateral posture. FIG. 13(b) shows them as in a state of being imprinted on a picture taken with the camera held in its vertical posture.

However, since the above stated prior art device necessitates the provision of data imprinting light emitting parts discretely for the lateral posture and the vertical posture of the camera, the device has presented a problem in respect of reduction in size and cost of the data imprinting device.

SUMMARY OF THE INVENTION

It is therefore an object of this invention to provide a data imprinting device for a camera which is capable of imprinting data in a correctly uprising state irrespective as to whether the camera is held in the lateral posture or in the vertical posture with the same data imprinting parts arranged to be usable for both the lateral and vertical postures of the camera, so that an increase in size and cost of the device is not realized.

To attain this object, a data imprinting device for a camera which is arranged according to this invention to imprint data on a film, forming characters, numerals, etc. with dots by operating a plurality of dot imprinting parts in synchronism with the travel of the film, comprises: detecting means for detecting whether the camera is in a lateral posture or a vertical posture; and control means for causing the same dot imprinting parts to operate in such a manner that required data is imprinted in a correctly uprising state in a lateral position when the lateral posture is detected by the detecting means and in a vertical position when the vertical posture is detected by the detecting means.

The above and other objects and features of this invention will become apparent from the following detailed description of embodiments thereof taken in connection with the accompanying drawings.

BRIEF DESCRIPTION OF THE DRAWINGS

FIG. 3 is a timing chart showing the operation of the circuit of FIG. 2. FIGS. 4(a) and 4(b) show the details of a decoder included in FIG. 2.

FIGS. 11(a) and 11(b) show the details of a decoder included in the circuit of FIG. 10.

DETAILED DESCRIPTION OF PREFERRED EMBODIMENTS

Figure 1A:
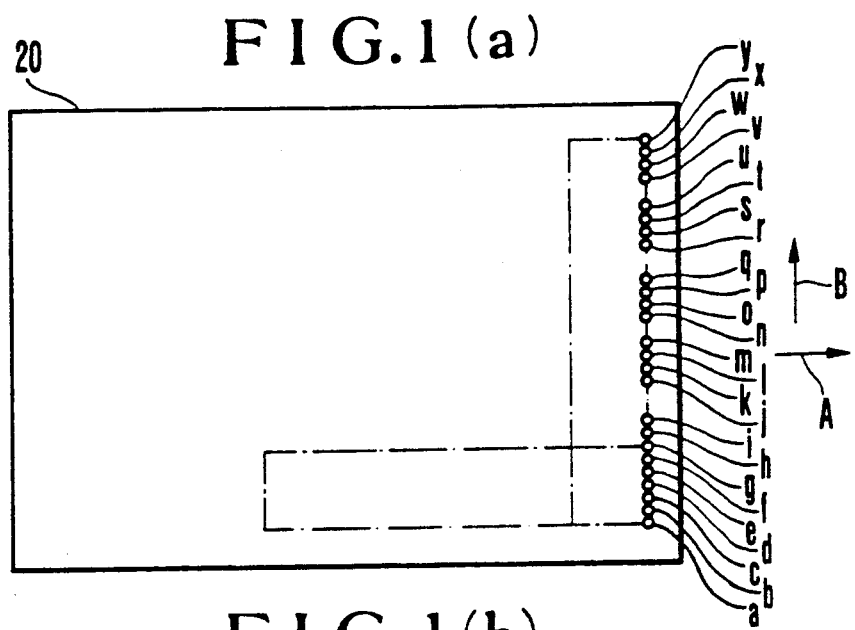
FIG. 1(a) shows the allocation of data imprinting light emitting elements in a first embodiment of this invention.
Figure 1B:
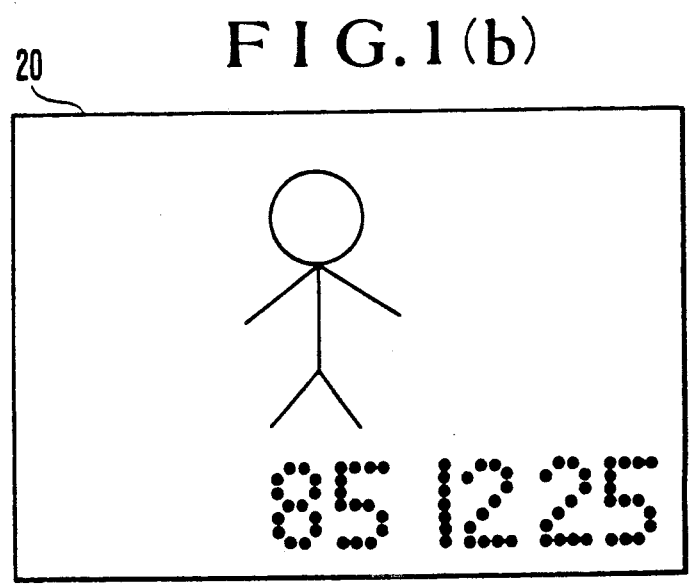
FIG. 1(b) shows data imprinted by the first embodiment with the camera in a lateral posture.
Figure 1C:
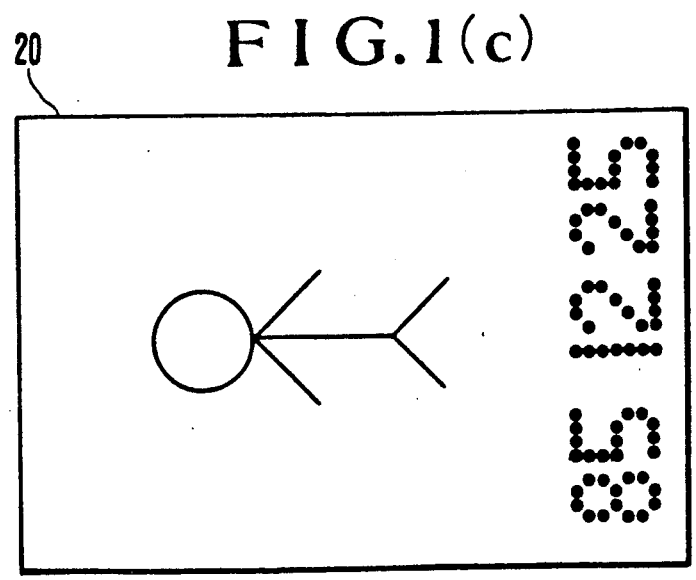
FIG. 1(c) shows data imprinted by the first embodiment with the camera in a vertical posture.

The following describes embodiments of this invention with reference to the accompanying drawings:

FIG. 1 shows the allocation of light emitting elements such as LEDs a to y which are arranged to serve as data imprinting light projecting parts within a camera arranged to perform a data imprinting function according to this invention as a first embodiment thereof. The illustration includes a photographing image plane 20. An arrow A shows the direction in which the image plane is to be moved, i.e. in which the film is to be wound or rewound. A total of 25 light emitting elements a to y are aligned in a row perpendicularly to the above stated film winding direction. When the camera is held in a lateral posture in shooting a scene as shown in FIG. 1(b), for example, seven light emitting elements a to g are lighted up one after another, in synchronism with the feeding movement of the film, in such a way as to have each data character formed with dots in a state of correctly uprising for the picture of the object to be photographed. In the event of shooting a scene with the camera in a vertical posture, 25 light emitting elements a to y are lighted up in synchronism with the feeding movement of the film, to have data characters formed with dots in a correctly uprising state in relation to the picture as shown in FIG. 1(c).

Figure 2:
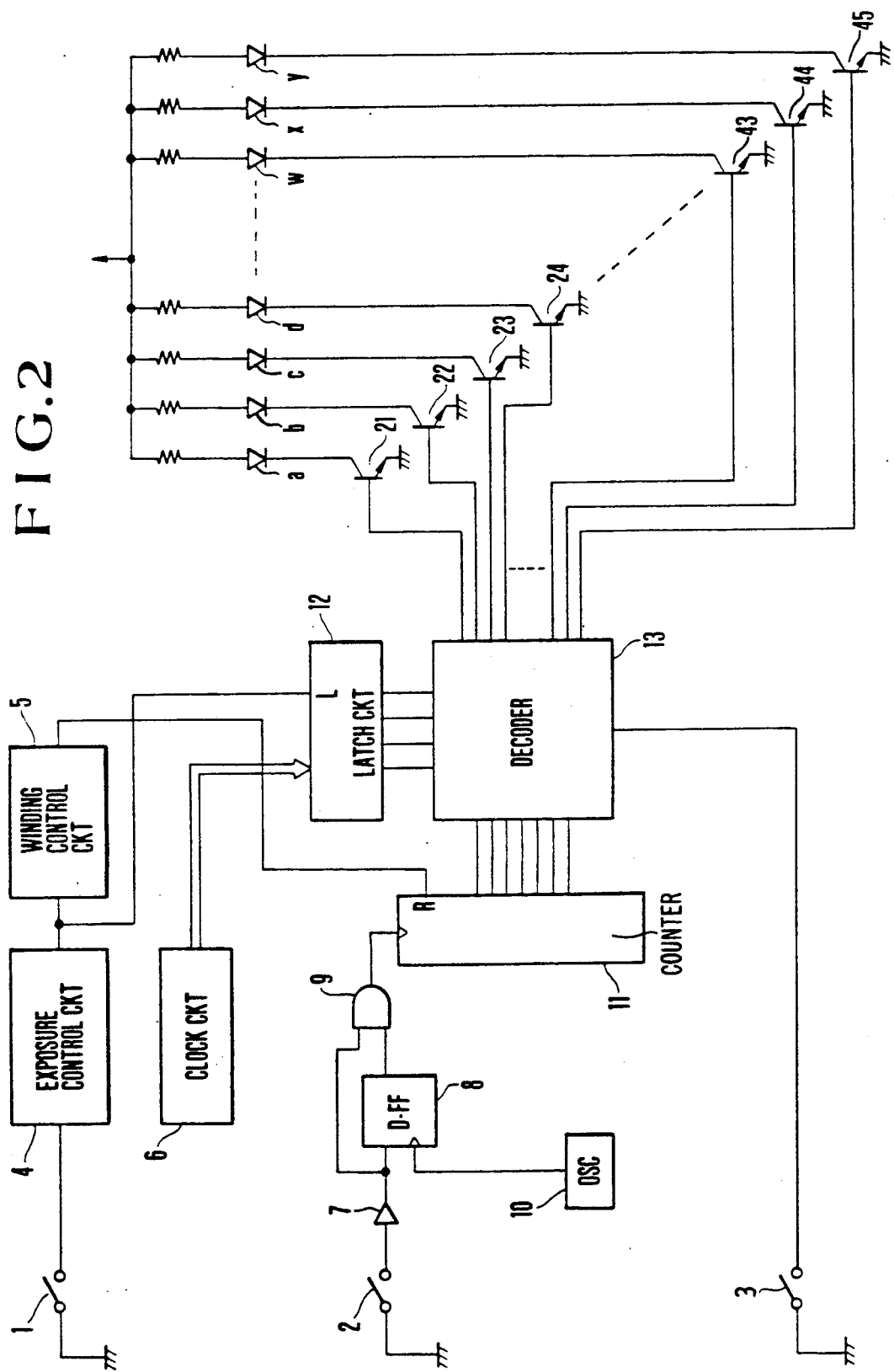
FIG. 2 is a circuit diagram showing the driving circuit of the first embodiment of this invention.

FIG. 2 shows a driving circuit of the first embodiment arranged to carry out data imprinting as mentioned above. Referring to FIG. 2, a shutter release switch 1 of the camera is arranged to open when it is pushed. A known exposure control circuit 4 is arranged to control an exposing action on the film. A known winding control circuit 5 is arranged to perform a film winding action after completion of an exposure. A switch 2 is arranged to repeat opening and closing actions in synchronism with the rotation of a sprocket which is not shown but is disposed within the camera. A buffer 7 is arranged to produce a signal coming from the switch 2. A D-type flip-flop (hereinafter referred to as D-FF for short) 8 is arranged to receive the output of the buffer 7 and that of an oscillator 10. An AND gate 9 is arranged to receive the output of the buffer 7 and that of the D-FF 8. The D-FF 8, the AND gate 9 and the oscillator 10 jointly form a one-shot circuit for preventing the switch 2 from chattering. A counter 11 is arranged to count the number of the opening and closing actions of the switch 2 as a number of pulses. A latch circuit 12 is arranged to receive an exposure completion signal at its latch terminal L from the exposure control circuit 4 and to latch data representing a time point immediately before the start of a film winding action through the output of a clock circuit 6. A decoder 13 receives the outputs of the counter 11 in parallel along with those of the latch circuit 12 and is arranged to function in a manner as will be described later on. A switch 3 is a known detection switch composed of a gravity switch such as a mercury switch, and is arranged, for example, to open when the camera is in a lateral posture and to close when the camera is in a vertical posture. The output of the switch 3 is supplied to the decoder 13.

Transistors 21 to 45 are connected to the 25 light emitting elements a to y and are arranged to light up or put out these light emitting elements by becoming conductive and non-conductive in accordance with the output signals of the decoder 13. In FIG. 2, some of these transistors and light emitting elements are omitted from the illustration.

The operation of the circuit which is arranged as described above is as follows: FIG. 3 shows in a timing chart the operations of the switch 1, the exposure control circuit 4 and the winding control circuit 5 of FIG. 2 along with that of a sprocket which is not shown in FIG. 2 and the light emitting timing of the light emitting elements a to y. The exposure control circuit 4 begins to operate as shown in the timing chart of FIG. 3 when the release switch 1 is operated. Upon completion of an exposure, the latch terminal L of the latch circuit 12 which is receiving data from the clock circuit 6 detects the fall of the output of the exposure control circuit 4. This latching action is performed for the purpose of preventing imprinting data from being changed during the film winding process by any change in the time data obtained from the clock circuit 6. The decoder 13 selects applicable transistors from among the transistors 21 to 45 in accordance with the counted value of the counter 11 which counts the number of opening and closing actions of the switch 2 performed in synchronism with the sprocket. This lights up or puts out applicable elements among the light emitting elements a to y for imprinting on the film, with dots, the data according to the outputs of the latch circuit 12 representing time information.

Figure 4B:
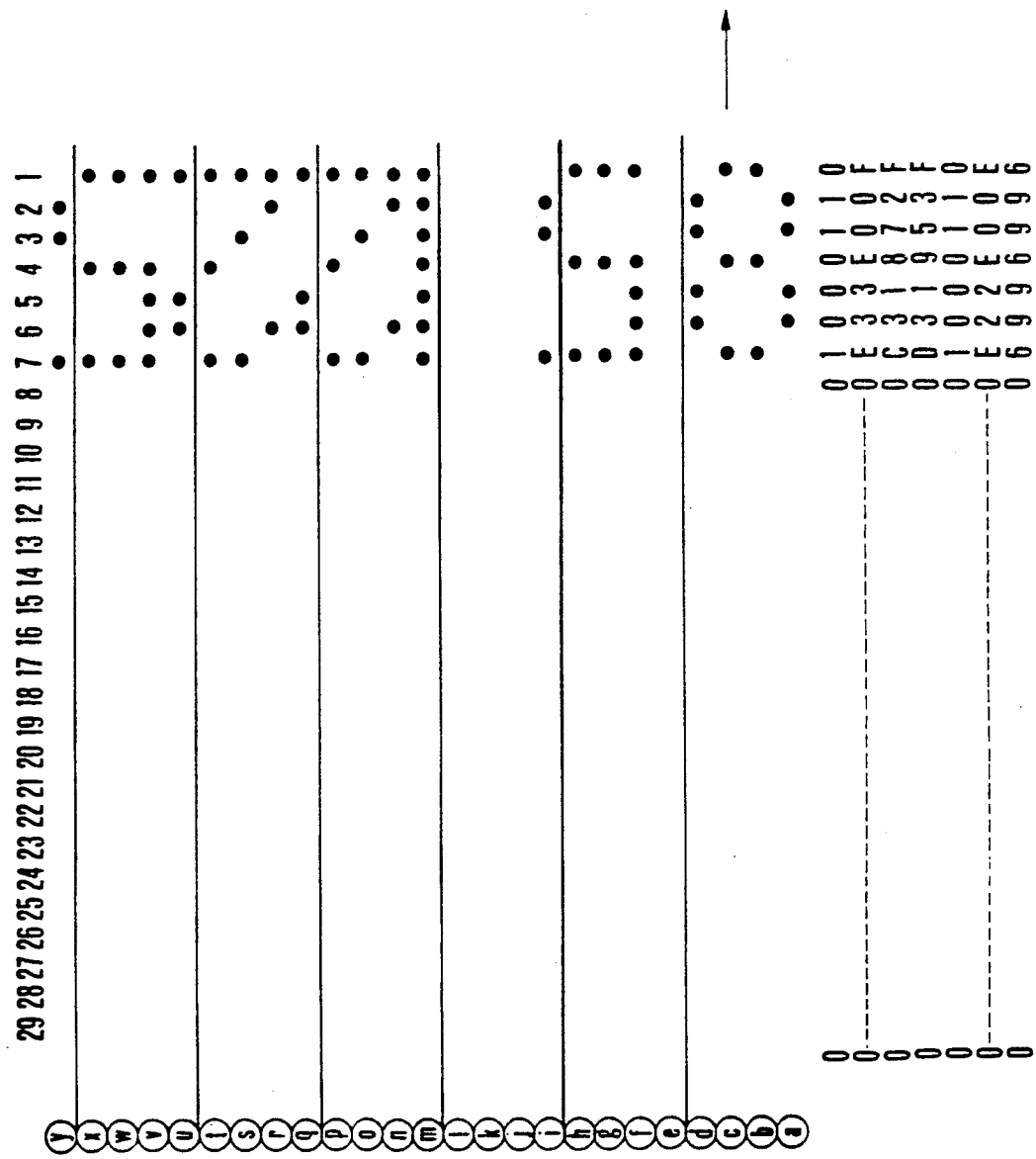

The details of the outputs of the decoder 13 are as shown in FIGS. 4(a) and 4(b). In the case of arrangement of the light emitting elements as shown in FIG. 1(a), nine light emitting element a to i are combined with four light emitting elements j to m, n to q, r to u or v to y. In a data processing system, however, the light emitting elements are divided into seven blocks consisting of combinations of four light emitting elements which forms four bits, including (a to d), (e to h), (i to l), (m to p), (q to t), (u to x) and (y). These seven blocks are as shown in FIG. 4(b). In the case of this embodiment, each data character is arranged to be formed by a 4×7 dot matrix.

Assuming that the date obtained at the clock circuit 6 is Dec. 25, 1985, for example, data of "85 12 25" is imprinted on the film. If the camera is in a lateral phototaking posture, the switch 3 turns off. Then, in response to the count action of the counter 11 which counts the pulses of the switch 2 generated in synchronism with film feeding, the output of the decoder 13 first causes the light emitting elements b and c to light up via the transistors 22 and 23 when the first of the pulses is generated. Then, the light emitting element g is likewise caused to light up as shown in FIG. 4(a). In other words, with the outputs of the decoder 13 to the light emitting elements forming four bits expressed in the hexadecimal notation, the block of the light emitting elements (a to d) corresponds to "6", the block of light emitting elements (e to h) to "4" when the first pulse is generated. At that instance, all other light emitting elements are not driven while the light emitting elements a to h are alone brought into a driven state. Next, when a second pulse is generated by the switch 2 in synchronism with the film feeding process, the decoder 13 brings only the light elements a and d of the block (a to d) into a driven state to indicate "9" in the hexadecimal notation and also brings only the light emitting element g of the block (e to h) into a driven state to indicate "4" in the hexadecimal notation. Following that, as shown in FIG. 4(a), pulse numbers up to "29" are selected one after another as applicable according to the counted value of the counter 11. As a result, data characters are imprinted in a correctly uprising state relative to the picture of the object taken with the camera in its lateral posture as shown in FIG. 1(b).

In the event of a vertical photo-taking posture of the camera, all the light emitting elements a to y are subjected to selection for use. Upon receipt of information that the camera is in the vertical posture from the switch 3, the decoder 13 produces its outputs as follows: When the first pulse is counted by the counter 11, the light emitting elements b and c of the block (a to d) are designated to indicate "6" in the hexadecimal notation while, in the block (e to h), the light emitting elements f, g and h are designated to indicate "E" in the hexadecimal notion as shown in FIG. 4(b). In the block of the light emitting elements (i to l), "0" is likewise obtained. When the second pulse is generated, "9" is likewise obtained from the light emitting element block (a to d); "0" from the light emitting element block (e to h); and so on.

In other words, in the event of the vertical photo-taking posture of the camera, applicable dots are allowed to light up using the 25 light emitting elements a to y in response to the pulses up to a seventh pulse. Then, data characters are imprinted on the film in a state of appositely uprising relative to the picture of the object taken with the camera held in the vertical posture as shown in FIG. 1(c).

In short, when the switch 3 which is arranged to sense the posture of the camera turns on with the camera held in its vertical posture, the addresses within the decoder 13 are readjusted to give data characters in a longitudinarily uprising state as shown in FIG. 4(b). In other words, if the decoder 13 is arranged to contain therein the data for a date consolidating the year, the month and the day both for the vertical and lateral postures, it is possible to have the two kinds of data switched from one over to the other by just controlling the most significant bit with the switch 3 according to whether it is "0" of "1".

The following description deals with a second embodiment of this invention: The second embodiment is arranged to permit reduction in the number of imprinting light emitting elements by using data characters arranged for vertical imprinting.

Figure 5A:
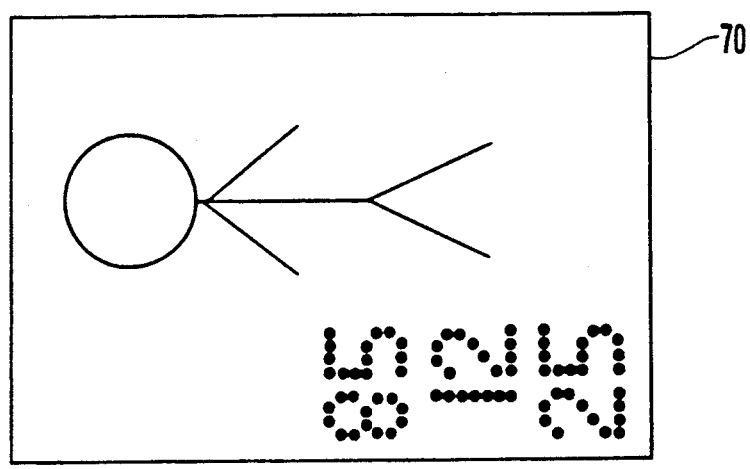
FIG. 5(a) shows data imprinted by a second embodiment of this invention with the camera held in its vertical posture.
Figure 5B:
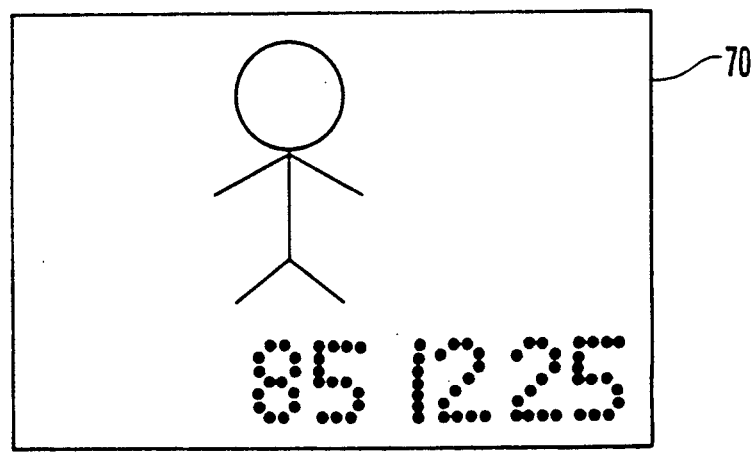
FIG. 5(b) shows data imprinted by the second embodiment with the camera in its lateral posture.
Figure 5C:
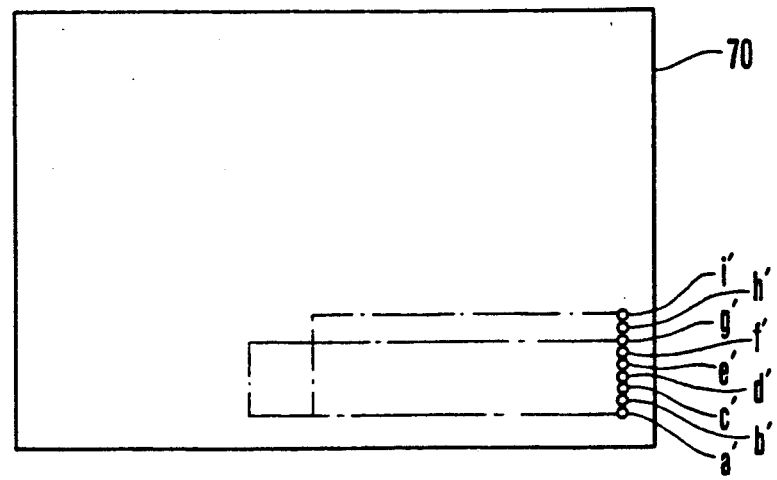
FIG. 5(c) shows the allocation of data imprinting light emitting elements in the second embodiment.

FIG. 5(a) shows an example of data imprinted by the data imprinting device of this embodiment on a picture taken with the camera held in a vertical posture. In this case, data for the year, month and day to be imprinted are arranged in blocks respectively. In other words, each of the data blocks is vertically imprinted to show the year, the month or the day. FIG. 5(b) shows an example of the data laterally imprinted by the data imprinting device. In this instance, the data is imprinted in a transversely aligned state in the same manner as in the case of the conventional data imprinting camera. FIG. 5(c) shows the allocation of light emitting elements arranged to serve as a data imprinting light projecting part of the camera. In the second embodiment, the light emitting elements are arranged to be lighted up and put out in synchronism with a film winding or rewinding action. A total of only nine light emitting elements are required for data imprinting in an adequate manner.

Referring to FIGS. 5(a) to 5(c), a reference numeral 70 denotes a photographing picture plane. The light emitting elements a' to i' employed as the light projecting parts are aligned in a row in a suitable position within the photographing picture plane. In imprinting the data characters in their applicable positions, the light emitting elements a' to i' are lighted up in the case of the vertical photo-taking posture as shown in FIG. 5(a) while the light emitting elements a' to g' are selectively lighted up for the lateral photo-taking posture as shown in FIG. 5(b).

Figure 6:
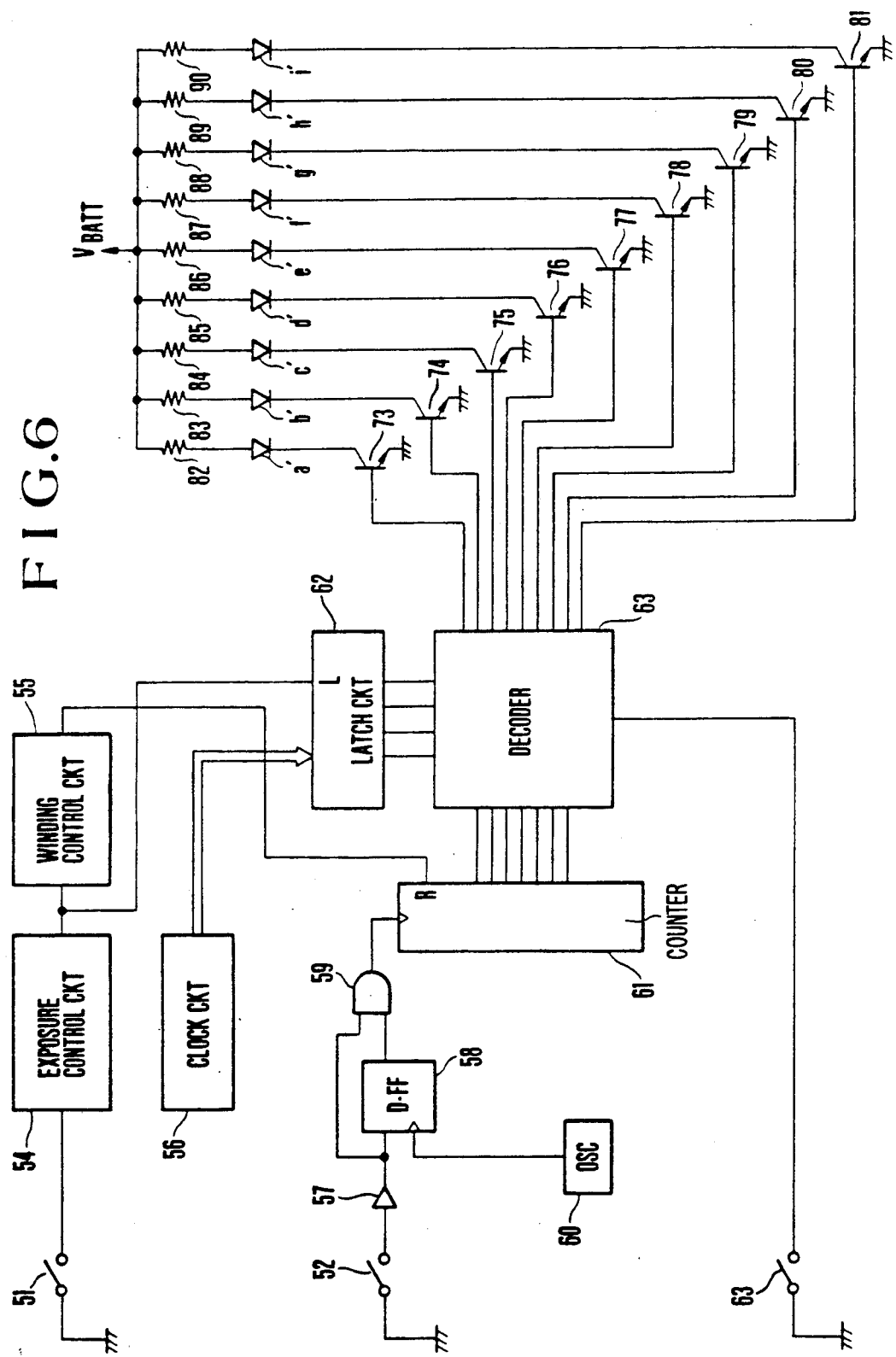
FIG. 6 is a circuit diagram showing the driving circuit of the second embodiment of this invention.

FIG. 6 shows in a circuit diagram the data imprinting device which is arranged to perform data imprinting as shown in FIG. 5(a) to 5(c). The circuit diagram includes a release switch 51 of the camera; a known exposure control circuit 54; a film winding control circuit 55; a known clock circuit 56; a switch 52 which turns on and off in synchronism with the rotation of a sprocket; a buffer 57; a D-type flip-flop (D-FF) 58; an AND gate 59; an oscillator 60; a counter 61; a latch circuit 62; a decoder 63; LEDs a' to i' which are the light emitting elements shown in FIG. 5(c); transistors 73 to 81 which are arranged to be selectively turned on and off by the outputs of the decoder 63; and current limiting resistors 82 to 90 which are connected to the LEDs and have their other ends connected to a power source.

The above stated circuit operates as follows: When a shutter button which is not shown is pushed, the release switch 51 turns off. This renders the exposure control circuit 54 operative. A photo-taking operation is performed through a known sequence of processes. Upon completion of the photo-taking operation, the winding control circuit 55 operates to move the exposed frame portion of the film. Then, a data imprinting action is performed in the following manner:

Upon completion of a sequence of processes of exposure control, the latch circuit 62 which is arranged to receive information on the completion of exposure control receives a high level signal from the exposure control circuit 54 at its latch terminal L. The latch circuit 62 then latches data obtained from the clock circuit 56 immediately before the start of a film winding action. This latching action is performed for the purpose of preventing the imprinting information from being changed by any change such as a time change that might occur during the process of the film winding action. The decoder 63 then converts the imprinting information into data to be imprinted. When the film winding action begins, the sprocket which is not shown rotates accordingly as the film is moved. The switch 52 turns on and off in synchronism with the rotation of the sprocket. The switch 52 thus produces recurrent pulses as a pulse signal. This pulse signal of the switch 52 is supplied via the buffer 57 to the one shot circuit which is composed of the D-FF 58 and the AND gate 59 to have its chattering noise removed therefrom. After removal of the chattering noise, the number of pulses of the pulse signal is counted by the counter 61. The outputs of the counter 61 are supplied in parallel to the decoder 63. The decoder 63 then produces signals according to the contents of the outputs of the counter 63 in a manner, for example, as shown in FIG. 7(a) in the case of the lateral photo-taking posture of the camera.

Figure 7:
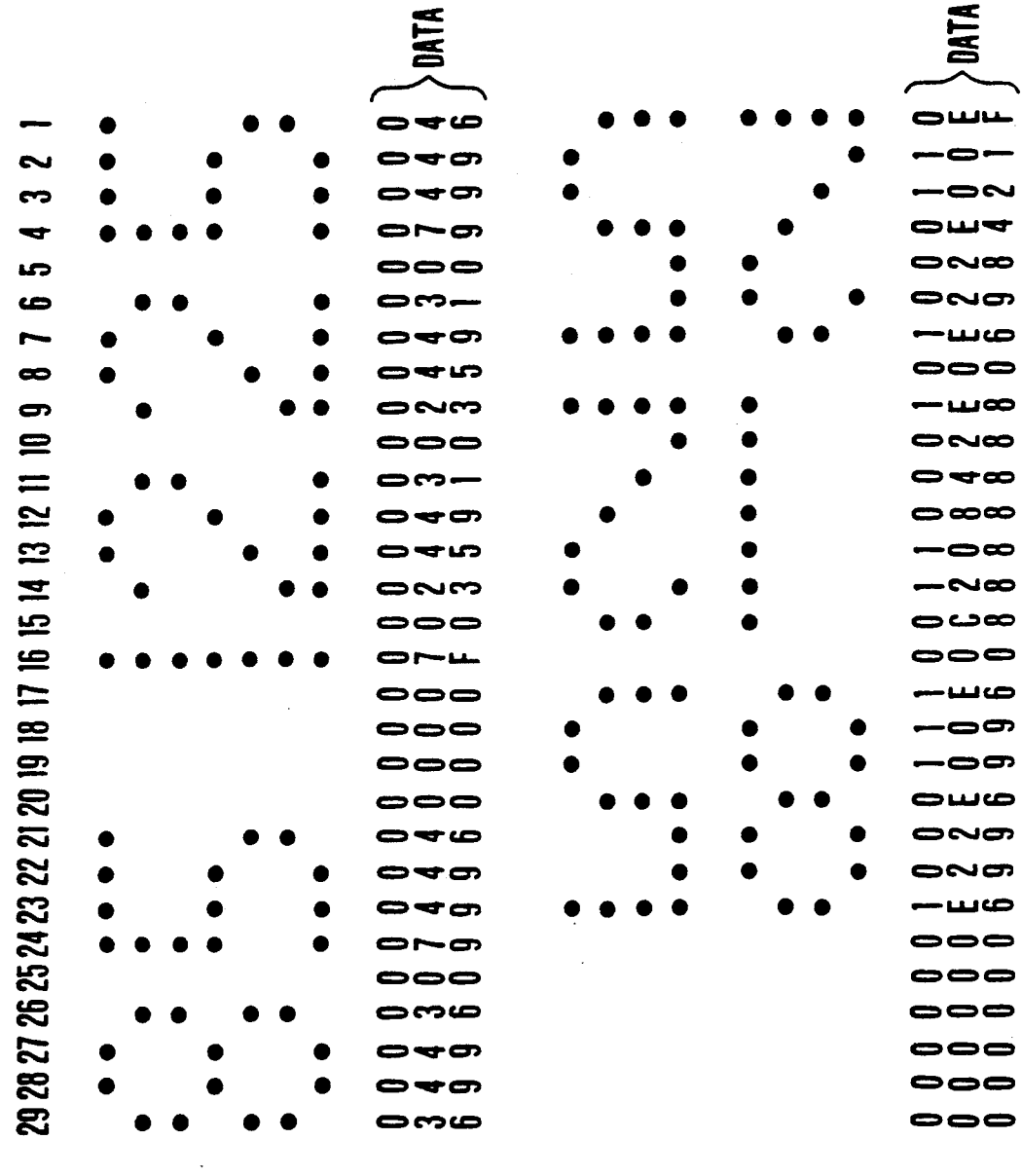
FIGS. 7(a) and 7(b) show the details of a decoder which is included in FIG. 6.

Referring to FIG. 7(a), numerals 1 to 29 which are laterally aligned in the upper part of the drawing represent the contents of the counter obtained by counting the pulses generated in synchronism with the rotation of the sprocket. These numerals correspond to the addresses provided within the decoder 63. Apostrophized alphabetical letters a' to g', which are vertically aligned, represent LEDs a' to g'. Black circle marks represent the LEDs which light up when the contents of the counter are applicable to the addresses of, the decoder 63 corresponding to them. The output of the decoder 63 expressed in the hexadecimal notation is as represented by numerals and characters which are shown in the lower part of FIG. 7(a), each consisting of three digits or characters.

When the content of the counter 61 is applicable to the address "1" of the decoder 63, for example, the signals from the decoder 63 turn on the transistors 74, 75 and 79 while other transistors remain off. Then, only the LEDs b', c' and g' are caused to light up.

A data imprinting operation is thus carried out by turning on and off the applicable LEDs, at the timing of the addresses corresponding to them, in synchronism with the rotation of the sprocket.

Figure 8:
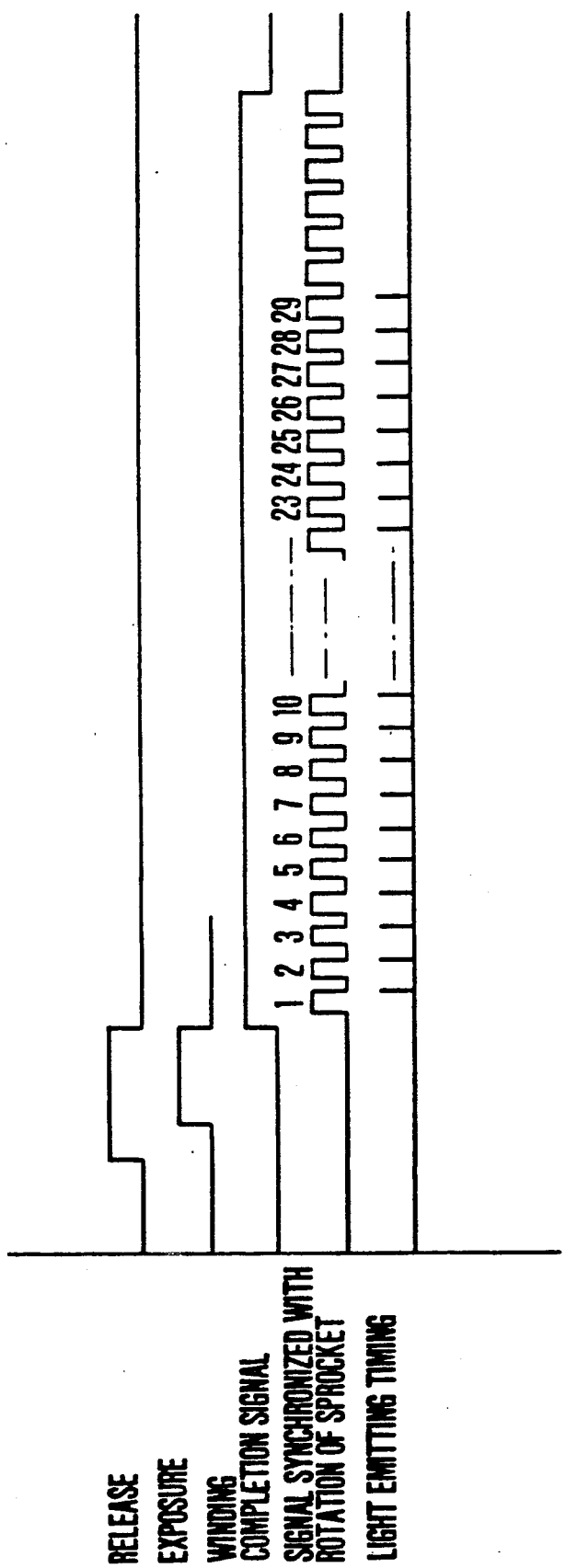
FIG. 8 is a timing chart showing the operation of the driving circuit shown in FIG. 6.

FIG. 8 is a timing chart showing the above stated timing. Data imprinting is performed with one of the LEDs aligned in a row selected and lighted up as applicable every time one of the pulses is generated in synchronism with the rotation of the sprocket during the process of the film winding action. Again referring to FIG. 6, a switch 53 which is preferably a gravity switch such as a mercury switch is arranged to detect whether the camera is in a vertical posture or in a lateral posture thereof.

When the camera is in the vertical posture, the switch 53 turns on to produce a signal. This signal is supplied to the decoder 63. The addresses within the decoder 63 are changed accordingly. As shown in FIG. 7(b), data are grouped for the year, the month and the day and are imprinted in the shape of characters toppled down into a vertical alignment. The data imprint as viewed on the photo-taking picture plane in this case becomes as shown in FIG. 5(a). In other words, with the data retained within the decoder arranged to include "85" for the year, "12" for the month and "25" for the day both for the vertical posture and for the lateral posture, the data can be automatically changed from one posture over to the other by just operating the switch 53 according to whether the most significant bit of the address of the decoder 63 is "1" or "0".

With the embodiment arranged in the above stated manner, the data can be laterally imprinted when the camera is in the lateral posture and can be vertically imprinted when the camera is in the vertical posture. Therefore, all the data can be imprinted as desired despite of the provision of a smaller number of light emitting elements.

A third embodiment of this invention is arranged as follows: The third embodiment is intended to further lessen the number of imprinting light emitting elements by deploying the data perpendicularly to the travelling direction of the film and by arranging this data to be imprinted in an oblique direction.

Figure 9C:
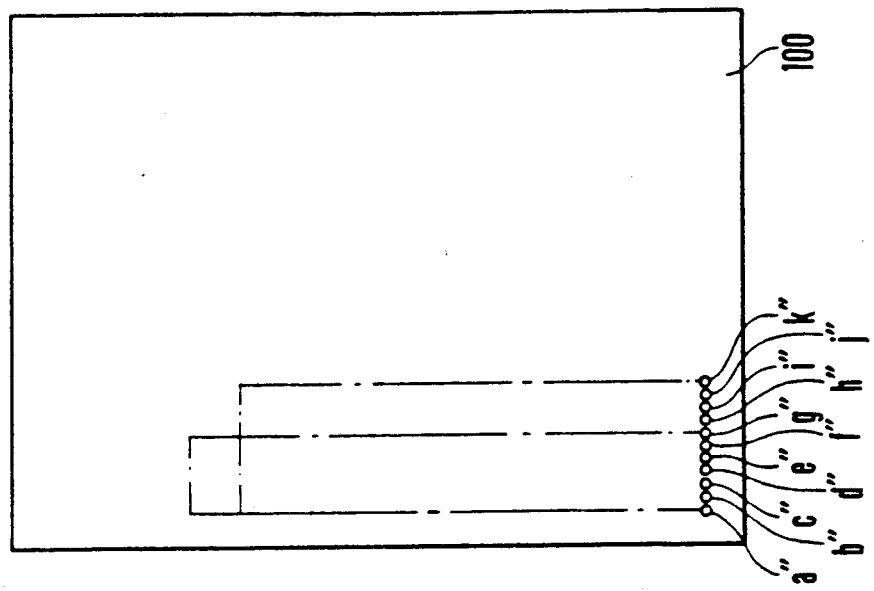
FIG. 9(c) shows the allocation of data imprinting light emitting elements in the third embodiment.
Figure 9B:
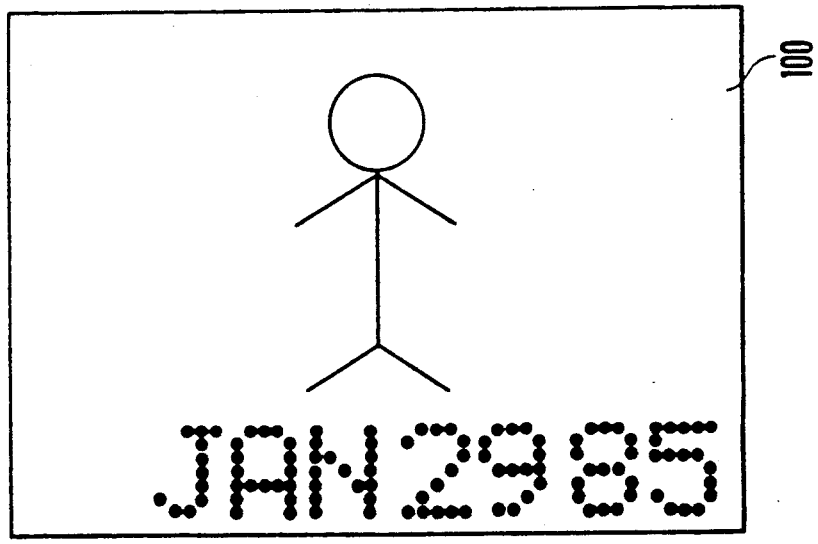
FIG. 9(b) shows data imprinted by the third embodiment with the camera held in its lateral posture.
Figure 9A:
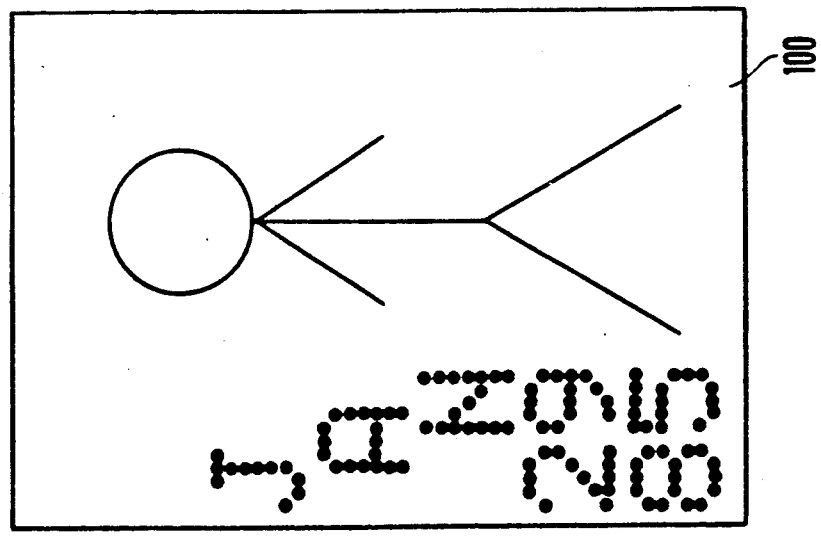
FIG. 9(a) shows data imprinted by a third embodiment of this invention with the camera held in its vertical posture.

FIG. 9(a) shows by way of example the data vertically imprinted with a camera which has a data imprinting device arranged as the third embodiment of this invention held in a vertical photo-taking posture. In this instance, the imprinting data includes the month expressed by three alphabetical characters. Three sets of dot matrix forming the shapes of the month, the day and the year are vertically imprinted in a state of three blocks. The three-character imprint of month is characterized by oblique set-back arrangement within the same width as other two-digit imprints of day and year in their longitudinal alignment within the picture.

FIG. 9(b) shows by way of example laterally imprinted data. In that instance, the data representing the year, the month and the day are laterally imprinted in a row in the same manner as in the case of the conventional data imprinting type camera.

FIG. 9(c) shows the allocation relative to a photographing picture plane of light emitting elements serving as the data imprinting light projecting parts of the camera which has the data imprinting device arranged as the third embodiment of this invention. Referring to FIG. 9(c), a reference numeral 100 denotes the picture plane. The light emitting or projecting elements a" to k" are aligned in a row in a suitable position relative to the longitudinal direction of the picture plane. In carrying out photographing with the camera in the vertical posture, such as in the case of FIG. 9(a), the light emitting elements a" to k" are selectively caused to emit a light. In the case of photographing with the camera in the lateral posture as shown in FIG. 9(b), the light emitting elements a" to g" are selectively caused to emit a light. This arrangement enables characters to be imprinted in appropriate positions respectively.

Figure 10:
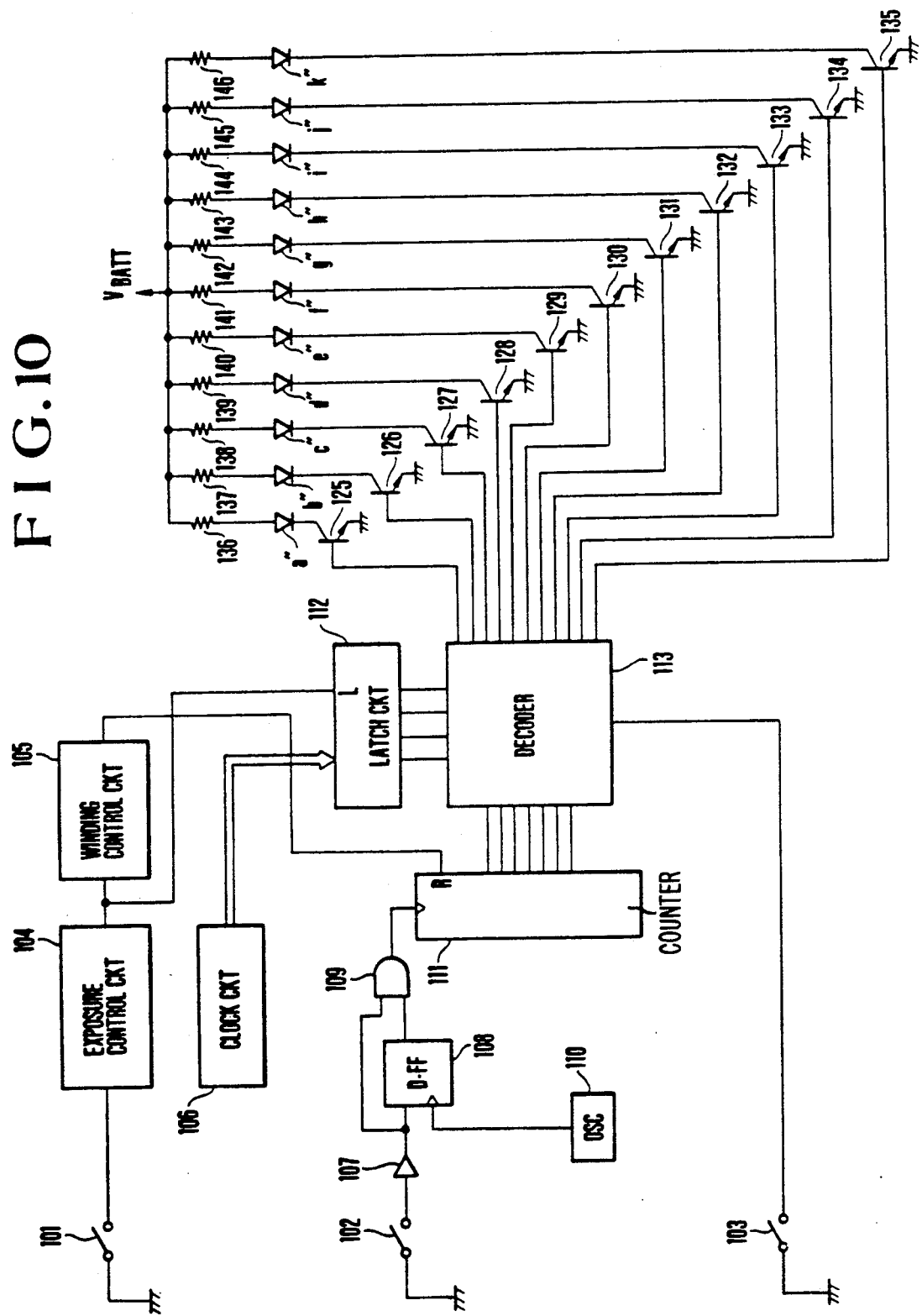
FIG. 10 is a circuit diagram showing the driving circuit of the third embodiment.

FIG. 10 shows a circuit arrangement of the data imprinting device for data imprinting as shown in FIGS. 9(a) to 9(c). The illustration includes a release switch 101 of the camera; a known exposure control circuit 104; a film winding control circuit 105; a known clock circuit 106; a switch 102 which is arranged to turn on and off in synchronism with the rotation of a sprocket; a buffer 107; a D-type flip-flop 108; an AND gate 109; an oscillator 110; a counter 111; a latch circuit 112; a decoder 113; LEDs a" to k" which are the light emitting elements shown in FIG. 9(c) and are arranged to be used for imprinting dots; transistors 125 to 135 which are arranged to be selectively caused to turn on and off the above stated LEDs by the outputs of the decoder 113; and resistors 136 to 146 which are connected respectively to the LEDs and have their other ends connected to a power source for the purpose of limiting currents flowing to the LEDs.

The circuit arrangement described operates as follows: When a shutter button which is not shown is pushed, the release switch 101 turns off. This triggers the operation of the exposure control circuit 104. A photographing operation is performed in a known sequence of processes. Upon completion of the photographing operation, the winding control circuit 105 begins to operate to move the used part of the film.

The data imprinting operation of the third embodiment is as follows: Upon completion of the sequence of processes of exposure control, a high level signal is supplied from the exposure control circuit 104 to the latch terminal L of the latch circuit 112. The latch circuit 112 then latches information obtained from the clock circuit 106 immediately before the commencement of a film winding action. This latching action is performed for the purpose of preventing the imprinting information from being changed during the process of the film winding action by, for example, some change in time. In accordance with the output of the latch circuit 112, the decoder 113 converts the imprinting information into imprinting data.

When the film winding begins, the sprocket which is not shown rotates accordingly as the film moves. Then, in synchronism with the rotation of the sprocket, the switch 102 repeatedly turns on and off to produce pulses. A pulse signal thus produced from the switch 102 is supplied via the buffer 107 to a one-shot circuit which consists of the D-FF 108 and the AND gate 109. The gate 109 removes chattering of this pulse signal. After that, the pulses of this signal are counted by the counter 111.

The outputs of the counter 111 thus obtained are supplied in parallel to each other to the decoder 113. Then, in accordance with the contents of these inputs, the decoder 113 produces signals as shown in FIG. 11(a).

Figures 11A, 11B:
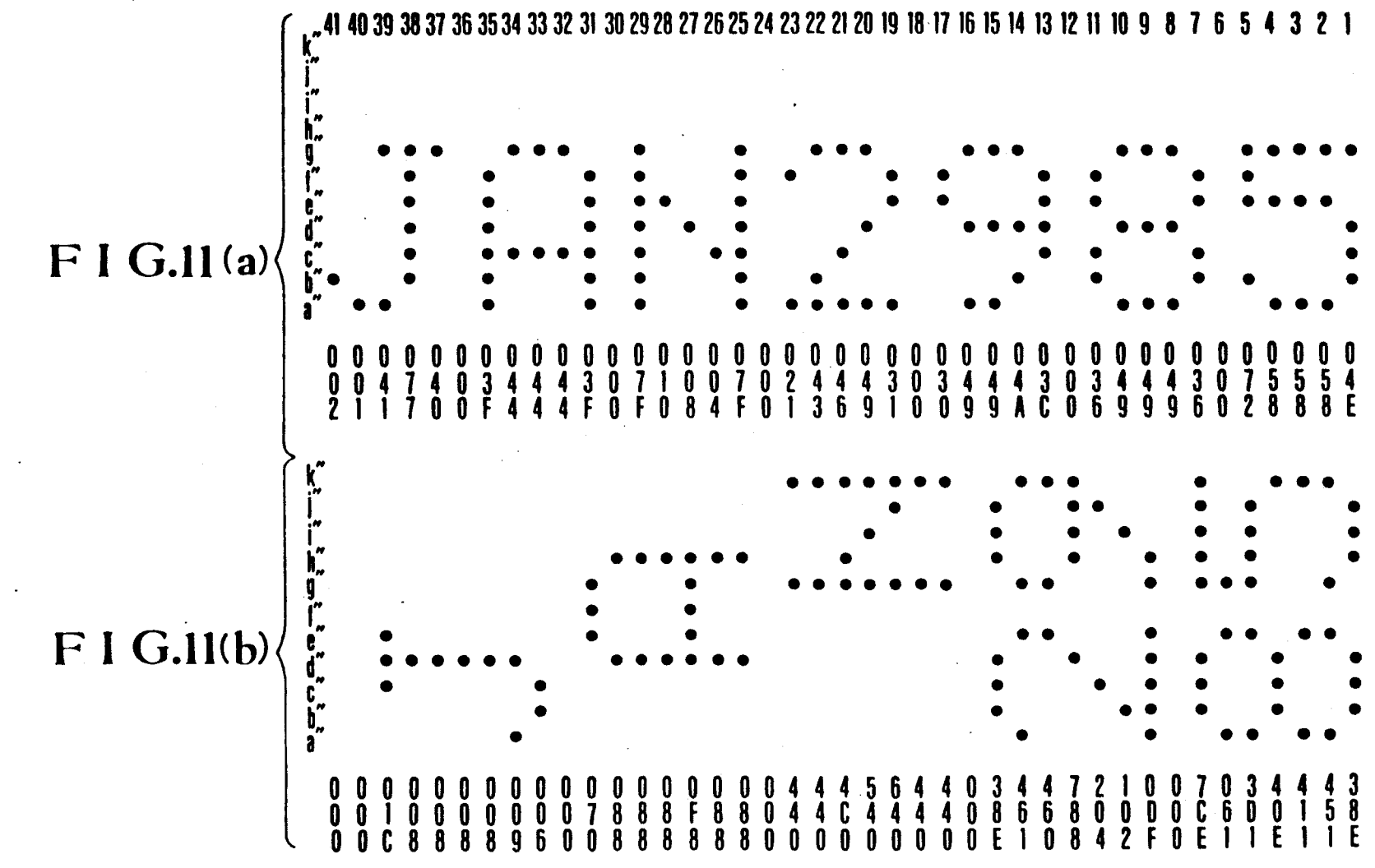

Referring to FIG. 11(a), numerals 1 to 41 which are laterally aligned in a row in the upper part of the drawing represent the contents of the counter 111 obtained by counting the pulses produced in synchronism with the rotation of the sprocket. These numerals correspond to the addresses of the decoder 113 and correlate with alphabetical characters a" to k" vertically aligned in the drawing. Black circular marks represent LEDs which are arranged to light up accordingly as the addresses corresponding to them become applicable. The outputs of the decoder 113 as expressed in the hexadecimal notation become as shown in the lower part of FIG. 11(a). As shown, each of these outputs consists of three characters.

With the output signals of the decoder 113 arranged as described above and with the switching transistors 125 to 135 assumed to be correlated to the address "1", for example, the transistors 126, 127, 128 and 131 turn on while other transistors are not turned on. In this instance, LEDs b", c", d" and g" are caused to light up while other LEDs remain extinct.

The data imprinting operation is thus accomplished by turning on applicable LEDs at the timing corresponding to the applicable addresses in synchronism with the rotation of the sprocket. The timing of the operation is as shown in FIG. 12.

Figure 12:
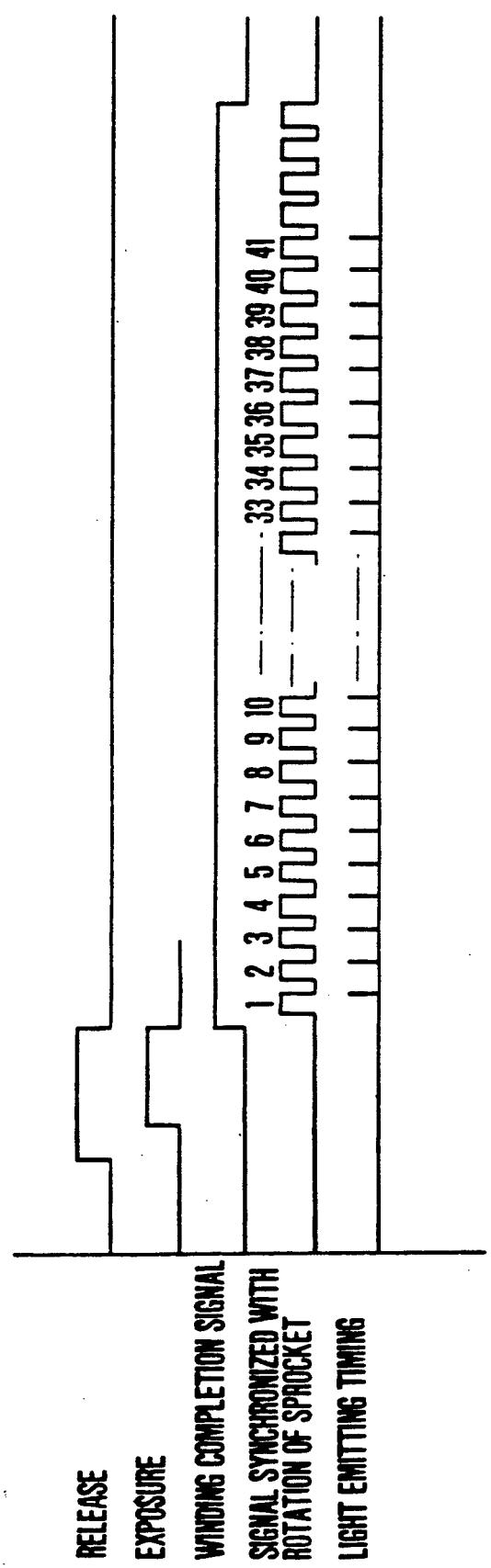
FIG. 12 is a timing chart showing the operation of the circuit of FIG. 10.
Figure 13B:
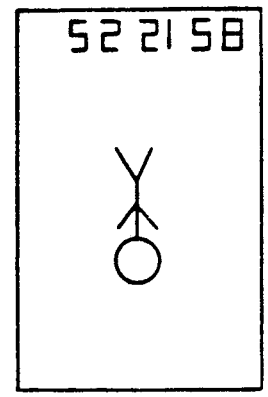
FIGS. 13(a) and 13(b) are illustrations of an example of the prior art.
Figure 13A:
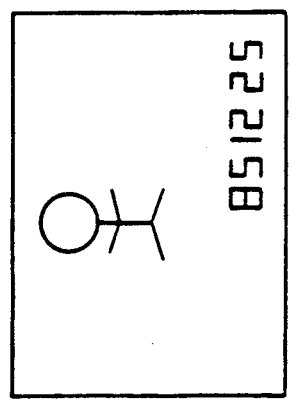

Referring to FIG. 12, one of the LEDs which is aligned in a row is selected and lighted up for data imprinting every time a pulse is produced in synchronism with the rotation of the sprocket during film winding.

Again referring to FIG. 10, the switch 103 is preferably a gravity switch such as a mercury switch and is arranged to detect whether the camera is in a vertical posture or in a lateral posture. In the event of the vertical posture, the switch 103 turns on to produce a signal. This signal is supplied to the decoder 113 to change the addresses provided within the decoder 113. Then, as shown in FIG. 11(b), the data are divided into blocks for the month, the day and the year and toppled down into a shape of uprising in the longitudinal direction of the picture plane. In addition to that, the three characters expressing the month are set back stepwise one by one to have an oblique contour in the longitudinal direction of the picture plane. By this arrangement, the total width of three characters expressing the month is compressed, perpendicularly to the traveling direction of the film, to the same width as other pairs of characters which respectively express the day and the year. This results in an imprint on the picture plane as shown in FIG. 9(a).

The above stated arrangement of third embodiment enables the data imprinting device to imprint all the data required for expressing a date with a reduced number of LEDs. Besides, since the alphabetical characters imprinted are not in a completely vertical alignment, they do not give an unnatural impression.

The data that can be imprinted in accordance with this invention is of course not limited to the imprinting data taken up by way of example in the foregoing description of the embodiments. Data of any other kinds may be likewise imprinted in accordance with the invention.

In a camera of the kind imprinting data on a film, in the form of characters, numerals, etc. consisting of dots, by operating a plurality of dot imprinting parts in synchronism with the travel of the film, the data imprinting device according to this invention is arranged as described in the foregoing to include means for detecting whether the camera is in a vertical posture or in a lateral posture: and control means for having the imprinting data imprinted in a state of uprising in a lateral position when the camera is detected to be in the lateral posture and in a state of uprising in a vertical position when the camera is detected to be in the vertical posture by the detecting means. Both the vertical and lateral imprinting actions are arranged to be accomplished by using the same dot imprinting parts through the control of the control means. In the invented data imprinting device, therefore, the same data imprinting parts are arranged to be used both for the lateral and vertical postures of the camera. The arrangement of the invention, therefore, effectively prevents the data imprinting device of this kind from increasing in size and cost thereof. Therefore, the degree of utility of this invention is very high.

What is claimed is:

1. A camera having a data recording device, comprising:
    a) a plurality of dot recording parts, arranged in one train having A to N parts, and
    b) a control circuit which causes said plurality of dot recording parts to operate in synchronism with travel of an image recording medium to form data with the dots,
    said control circuit causing successive parts A and B of said A to N parts to operate in a first period during which the image recording medium is travelling, and causing successive plural parts C to N including part of the parts A and B to operate in a second period which is different from the first period to record data on the image recording medium.

2. A camera according to claim 1, wherein said camera further comprises detection means for detecting a posture of said camera and said control circuit operates in a first data recording state in which data are recording at different times using the A and B parts and the C to N parts, and operates in a second data recording state in which predetermined successive plural parts among the parts A to N are fixed and operated to record the data using the predetermined successive plural parts, and wherein said camera further comprises a selection circuit for selecting the first or second data recording state on the basis of the posture detected by said detecting means.

3. A camera arranged to imprint data on a film, forming the data with dots by operating a plurality of dot imprinting parts arranged in one line in synchronism with the travel of the film, comprising:
    a) detecting means for detecting whether the camera is in a lateral posture or a vertical posture; and
    b) control means for causing the same dot imprinting parts to operate in such a manner that required data is imprinted in a correctly upright state in a lateral position when the lateral posture is detected by said detecting means and in a vertical position when the vertical posture is detected by said detecting means,
    said control means operating in a first mode in which a predetermined number of parts of the plurality of dot imprinting parts arranged in one line are made operable while the film is travelling a predetermined distance to imprint the data in a zone of the predetermined distance of the travel using the predetermined number of parts, said control means also operating in a second mode in which parts less in number than the number of parts operable in the first mode are made operable for a longer travel distance than the predetermined travel distance of the film in the first mode to imprint the data in a zone of travel longer than the predetermined travel distance of the film using the parts less in number than the number of parts used in the first mode, and
    c) a selection circuit for selecting the first or second mode according to a camera posture detected by said detecting means.

4. A camera arranged to imprint data on a film, forming the data with dots operating a plurality of dot imprinting parts in synchronism with the travel of the film, comprising:
    a) detecting means for detecting whether the camera is in a lateral posture or a vertical posture; and
    b) control means for causing the same dot imprinting parts to operate in such a manner that required data is imprinted in a correctly uprising state in a lateral position when the lateral posture is detected by said detecting means and in a vertical position when the vertical posture is detected by said detecting means.

5. A camera according to claim 4, wherein said control means includes means for setting the form of imprinting data uprising in the travelling direction of the film to a vertically uprising form.

6. A camera according to claim 4 wherein said control means includes means for setting the form of imprinting data stretching perpendicular to the travelling direction of the film to a form of having the stretching state thereof obliquely compressed.

7. A data recording device for a camera arranged to record data on an image recording medium, forming the data with dots by operating a plurality of dot recording parts arranged in one line in synchronism with the travel of the image recording medium, comprising:
   a) detection means for detecting a posture of the camera or an image frame; and
   b) control means for recording the data using the dot recording parts in response to said detection means in such a manner that the data is recorded in a posture normal to the detected posture of the camera or the image frame,
   said control means operating in a first mode in which a predetermined number of the dot recording parts arranged in one line are made operable while the image recording medium is travelling a predetermined distance to record the data in a zone of the predetermined distance of travel of the image recording medium using the predetermined number of recording parts, said control means also operating in a second mode in which recording parts less in number than the predetermined number of recording parts to be made operable in the first mode are made operable for a longer travel distance than the predetermined travel distance of the image recording medium in the first mode to record the data in a zone of travel longer than the predetermined travel distance using the recording parts less in number than the number of the recording parts used in the first mode, and
   c) a selection circuit for selecting the first or second mode according to a posture of the camera or the image frame detected by the detection means.

8. A device according to claim 7, wherein said control means includes means for setting the form of recording data uprising in the travelling direction of the image recording medium to a vertically uprising form.

9. A device according to claim 8, wherein said control means includes means for setting the form of recording data stretching perpendicular to the travelling direction of the image recording medium to an obliquely compressed form.

10. A device according to claim 7, wherein said control means includes means for setting the form of recording data stretching perpendicular to the travelling direction of the image recording medium to an obliquely compressed form.

11. A device according to claim 7, further comprising clock means for forming the data and latch means for latching an output of said clock means immediately before the data recording to use the latched data as the recording data.

12. A camera arranged to record data on an image recording medium, forming the data with dots by operating a plurality of dot recording parts in one line in synchronism with the travel of the image recording medium, comprising:
   a) detection means for detecting a posture of the camera of an image frame; and
   b) control means for recording the data using the dot recording parts in response to said detection means in such a manner that the data is recorded in a posture normal to the detected posture of the camera or the image frame,
   said control means operating in a first mode in which a predetermined number of recording parts of the plurality of dot recording parts arranged in one line are made operable while the image recording medium is travelling a predetermined distance to record the data in a zone of the predetermined distance of travel of the image recording medium using the predetermined number of recording parts, said control means also operating in a second mode in which recording parts less in number than the predetermined number of recording parts to be made operable in the first mode are made operable for a longer travel distance than the predetermined travel distance of the image recording medium in the first mode to record the data in a zone of travel longer than the predetermined travel distance using the recording parts less in number than the number of the recording parts used in the first mode, and
   c) a selection circuit for selecting the first or second mode according to a posture of the camera or the image frame detected by said detection means.

13. A camera according to claim 12, wherein said control means includes means for setting the form of recording data uprising in the travelling direction of the image recording medium to a vertically uprising form.

14. A camera according to claim 13, wherein said control means includes means for setting the form of recording data stretching perpendicular to the travelling direction of the image recording medium to an obliquely compressed form.

15. A camera according to claim 12, wherein said control means includes means for setting the form of recording data stretching perpendicular to the travelling direction of the image recording medium to an obliquely compressed form.

16. A camera according to claim 12, further comprising clock means for forming the data and latch means for latching an output of said clock means immediately before the data recording to use the latched data as the recording data.

* * * * *

UNITED STATES PATENT AND TRADEMARK OFFICE
CERTIFICATE OF CORRECTION

PATENT NO. : 5,128,702        Page 1 of 2
DATED      : July 7, 1992
INVENTOR(S): Ogawa et al.

It is certified that error appears in the above-identified patent and that said Letters Patent is hereby corrected as shown below:

COLUMN 4:

Line 12, "forms" should read --form--.

COLUMN 6:

Line 32, "counter 63" should read --counter 61--; and

Line 44, "of," should read --of--.

COLUMN 7:

Line 22, "of" should be deleted.

COLUMN 10:

Delete lines 61-68, lines 61-68-- and insert --4. A camera according to Claim 3, further comprising clock means for forming the data and latch means for latching an output of said clock means immediately before the data imprinting to use the latched data as the imprinting data.--

UNITED STATES PATENT AND TRADEMARK OFFICE
CERTIFICATE OF CORRECTION

PATENT NO.   : 5,128,702

DATED        : July 7, 1992

INVENTOR(S)  : Ogawa et al.

It is certified that error appears in the above-identified patent and that said Letters Patent is hereby corrected as shown below:

<u>COLUMN 11</u>:

Lines 1-5, "delete lines 1-5;

Line 6, "claim 4," should read --claim 3,--;

Line 10, "claim 4," should read --claim 3,--; and

<u>COLUMN 11</u>:

Line 22, "frame; and " should read --frame, --.

Column 12, line 14, "frame; and" should read --frame, --.

Signed and Sealed this

Twenty-eighth Day of December, 1993

Attest:

BRUCE LEHMAN

Attesting Officer

Commissioner of Patents and Trademarks